United States Patent
Yamane et al.

(10) Patent No.: US 7,467,509 B2
(45) Date of Patent: Dec. 23, 2008

(54) SEAL CHAIN

(75) Inventors: Kentaro Yamane, Osaka (JP); Makoto Fujiwara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 87 days.

(21) Appl. No.: 11/879,681

(22) Filed: Jul. 18, 2007

(65) Prior Publication Data

US 2008/0061512 A1  Mar. 13, 2008

(30) Foreign Application Priority Data

Sep. 13, 2006  (JP) ............................. 2006-248749

(51) Int. Cl.
*F16G 13/06* (2006.01)
(52) U.S. Cl. ................. 59/4; 59/78; 474/207
(58) Field of Classification Search .............. 59/4, 59/5, 8, 78, 93; 474/206, 207, 231
See application file for complete search history.

(56) References Cited

U.S. PATENT DOCUMENTS

| | | | | |
|---|---|---|---|---|
| 3,135,128 A | * | 6/1964 | Rudolph | 474/207 |
| 4,464,151 A | * | 8/1984 | Kahl | 474/231 |
| 5,425,679 A | * | 6/1995 | Utz | 474/231 |
| 5,459,993 A | * | 10/1995 | Kuriyama et al. | 59/4 |
| 5,787,700 A | * | 8/1998 | Tanaka | 59/5 |
| 5,809,767 A | * | 9/1998 | Tanaka | 59/5 |
| 5,943,855 A | * | 8/1999 | Morimoto et al. | 59/5 |
| 6,782,688 B2 | * | 8/2004 | Garbagnati et al. | 59/5 |

FOREIGN PATENT DOCUMENTS

JP  5-1717  1/1993

\* cited by examiner

*Primary Examiner*—David B Jones
(74) *Attorney, Agent, or Firm*—Howson & Howson LLP

(57) ABSTRACT

In a seal chain, a seal mechanism disposed between opposed surfaces of inner and outer link plates comprises an elastic ring, a seal ring adhered to the outer link plate, an annular resin seal having a base adhered to the inner link plate, a tongue on the annular resin seal in abutting relationship with the outer link plate, and a ring-shaped plate adhered to the outer link plate. The elastic ring is held between an inclined surface formed on an end of a bushing that protrudes past the inner link plate, and an inclined inner surface of the seal ring. The inner circumferential surface of base of the annular resin seal slides on the outer circumferential surface of the seal ring.

4 Claims, 6 Drawing Sheets

SEAL CHAIN

CROSS-REFERENCE TO RELATED APPLICATION

This application claims priority on the basis of Japanese patent application 2006-248749, filed Sep. 13, 2006. The disclosure of Japanese application 2006-248749 is hereby incorporated by reference.

FIELD OF THE INVENTION

This invention relates to a seal chain for use in power transmission, conveyors and the like, and more specifically to a chain in which a seal mechanism is disposed between opposed surfaces of an inner link plate and an outer link plate for preventing lubricant, such as oil, grease or the like, sealed between an outer circumferential surface of a pin and an inner circumferential surface of a bushing, from leaking to the outside, and for preventing foreign matter from entering into the gap between the outer circumferential surface of the pin and the inner circumferential surface of the bushing.

BACKGROUND OF THE INVENTION

Seal chains are generally used as high speed transmission chains, and a conveyor chains, especially where a chain having a high load capacity is required to operate in a dusty environment. A seal chain includes seals between inner and outer link plate to prevent the release of lubricant sealed between a pin and a bushing and to prevent the entry of foreign matter from outside. Various seal mechanisms have been provided.

An example of a conventional seal chain is shown in FIG. 7. The seal mechanism 20 comprises a seal ring 23, composed of nitrided steel or stainless steel, provided between an end of a bushing 21 and the inside face of an outer link plate 22 and an elastic ring 24 provided between the seal ring 23 and the bushing 21. The elastic ring 24 presses a sliding surface 23c of the seal ring 23 against the inside face of the outer link plate 22. The elastic ring 24 is held by a groove 21a in the bushing 21, and a groove 23a of the seal ring 23. At the same time, the elastic ring 24 is sandwiched by a vertical surface 21b of the bushing 21 and a vertical surface 23b of the seal ring 23. Further details of the conventional seal chain can be found in Japanese Utility Model Publication No. Hei. 5-1717.

In the conventional seal chain, the seal mechanism 20 has a one layer seal structure comprising the seal ring 23 and the elastic ring 24. Resistance to entry of foreign matter is not adequate. Moreover, as an inner link plate 25 of the chain shifts to the right or left as the chain travels, and approaches an outer link plate, compression of the elastic ring 24 between the vertical surface 21b of the bushing 24 and the vertical surface 23b of the seal ring 23 can cause deterioration and permanent deformation of the elastic ring, impairment of its sealing performance, and a decrease in its useful life.

An object of this invention is to solve the above-mentioned problems encountered in a conventional seal chain, and to provide a seal chain exhibiting improved sealing performance, improved resistance to the entry of foreign matter, and improved endurance.

SUMMARY OF THE INVENTION

The seal chain in accordance with the invention comprises alternating outer and inner links. Each outer link comprises a pair of spaced outer link plates having inner faces. The outer link plates are connected by a pair of pins the ends of which are fitted to pin holes in the outer link plates. Each inner link comprises a pair of spaced inner link plates having outer faces. The inner link plates are connected by a pair of bushings fitted into bushing holes in the inner link plates. The bushings have outer ends that extend outward beyond the outer faces of the inner link plates. Each pin of an outer link extends rotatably though a bushing of an adjacent inner link so that the alternating inner and outer links are articulably connected together.

The chain is provided with seals for resisting the outward flow of lubricant from within the bushings and for resisting the entry of foreign matter into the bushings. Each seal comprises four components: an elastic ring, a seal ring, an annular resin seal having a tongue, and a ring-shaped plate.

The elastic ring is disposed in coaxial relationship with one of the pins, and is contact with an inclined outer circumferential surface formed on an outer end of one of the bushings. The seal ring is disposed in coaxial relationship with the elastic ring and has an inclined inner circumferential surface in contact with the elastic ring. Thus, the elastic ring is held between the inclined outer circumferential surface of the bushing and the inclined inner circumferential surface of the seal ring. The seal ring also has a surface press-contacting an inner face of an outer link plate and an outer circumferential surface. That is, a surface of the seal ring presses against the inner face of the outer link plate. The annular resin seal has an annular base in slidable contact with the outer circumferential surface of the seal ring, and a tongue extending radially outward from the annular base. The base of the annular resin seal press-contacts the outer face of an inner link plate, and the tongue abuts the inner face of the outer link plate. The ring-shaped plate is disposed radially outside the annular resin seal and adheres to the inner face of the outer link plate.

Preferably, the annular resin seal is molded as a unit from a nylon resin, and in the preferred embodiment, an enclosed annular space is defined by the tongue of the annular resin seal, and portions of the inner face of an outer link plate and the outer circumferential surface of the seal ring.

The seal chain according to the invention has a double seal structure composed of the elastic ring, the seal ring and the annular seal member having a tongue. Thus, the seal chain of the invention ensures superior sealing performance, and can more effectively prevent the entry of foreign matter into the gaps between the pins and the bushings.

The ring-shaped plate assists in preventing foreign matter from entering into the gaps between the pins and the bushings by suppressing the entry of foreign matter into the spaces between opposed surfaces of the inner and outer link plates, thereby further improving the endurance of the chain.

Furthermore, since the elastic ring is held between an inclined surface formed on the outer circumference of the end of a bushing and an inclined surface formed on the inner circumference of the seal ring, the amount of deformation of the cross-section of the elastic ring is less, for a given relative lateral movement of the inner and outer link plates, than in the case of a conventional seal, and consequently the endurance of the elastic ring is improved.

The annular resin seal member comprises an annular base and a tongue extending upright from the base. The inner circumferential surface of the base is in close sliding contact with the outer circumferential surface of the seal ring, and the base press-contacts the outer face of an inner link plate. The opposite end of the tongue abuts the opposing inner face of the outer link plate. Thus, when the inner link plate shifts laterally so that it approaches or moves away from its facing outer link plate, the inner circumferential surface of the base of the annular resin seal member slides on the outer circumferential surface of the seal ring, and its tongue deforms, while the annular resin seal member maintains contact with both of the mutually facing inner and outer link plates, thereby maintaining a seal and preventing entry of foreign matter.

The ring-shaped plate, which is disposed outside the annular resin seal, is spaced from the inner link plate. Even if a space is formed between the tongue and the outer link plate, the ring-shaped plate and the annular resin seal cooperate to form a labyrinth that resists outward flow of lubricant from within the bushing, and also resists entry of foreign matter, while maintaining good seal performance.

The seal mechanism has an annular space defined by the seal ring, the annular resin seal with a tongue, and the inner face of an outer link plate. This annular space portion serves as a lubricant reservoir, and the lubricant in this reservoir suppresses wear between the seal ring and the outer link plate, between the seal ring and the annular resin seal, and between the annular resin seal and the outer link plate, thereby extending the life of the seal. The seal structure also resists outward flow of lubricant from between the pin and the bushing, thereby maintaining lubricity between the pin and the bushing over a long period of time.

When the annular resin seal having a tongue is molded as a unit from a nylon resin, a seal having particularly good endurance is realized. A preferred nylon resin is "MC" nylon available from Nippon Polypenco Limited, 5-2, Marunouchi 2-chome, Chiyoda-ku, Tokyo, Japan. MC nylon is obtained by polymerization and molding of the main raw material of nylon monomer under atmospheric pressure, and is a nylon exhibiting improved properties, and in particular, excellent continuous performance at high temperature, chemical resistance, mechanical strength, wear resistance, and sliding properties.

DETAILED DESCRIPTION OF THE PREFERRED EMBODIMENT

Figure 1:
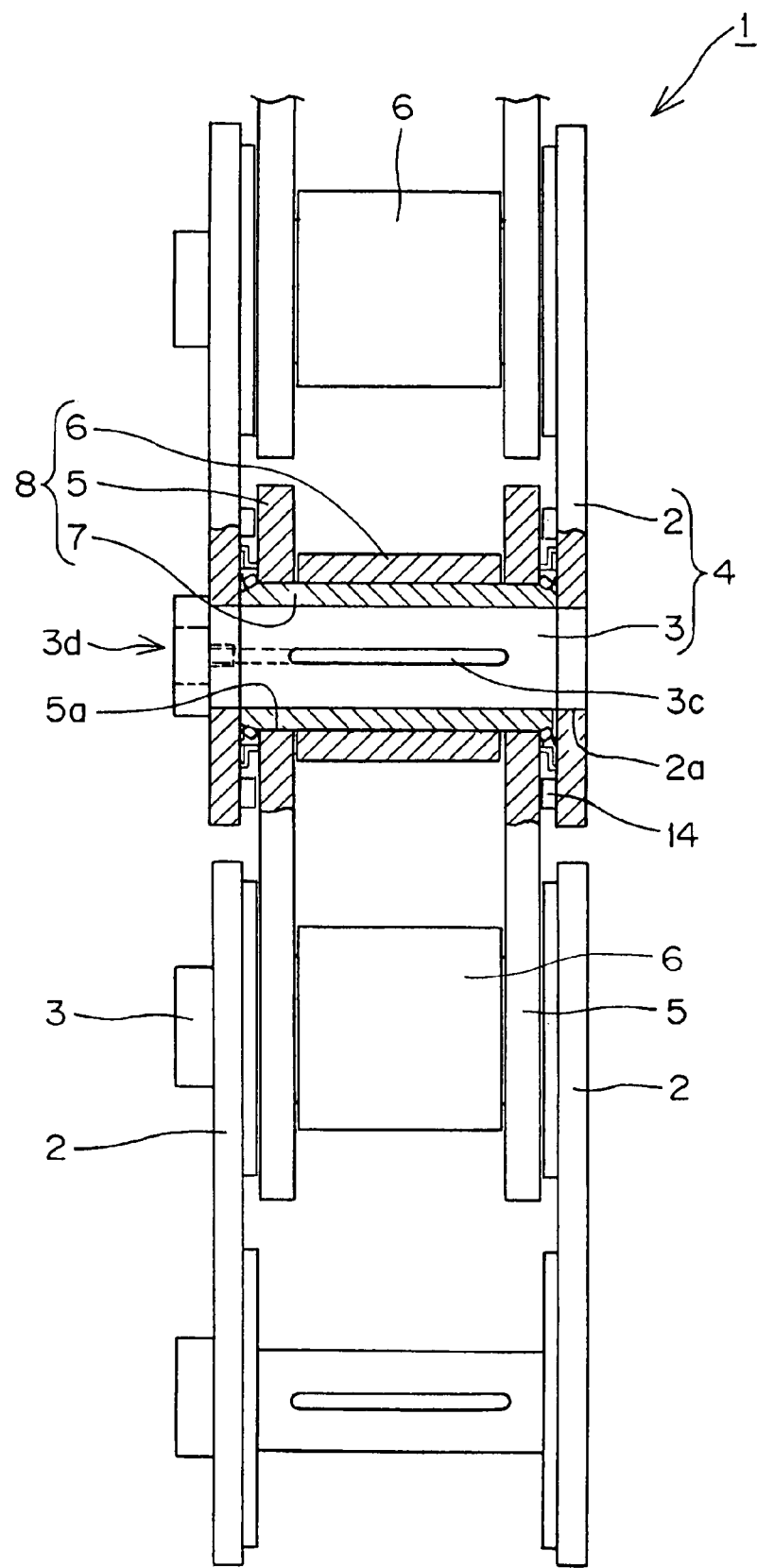
FIG. 1 is a plan view, partially in section, of a portion of a seal chain according to the invention.
Figure 2:
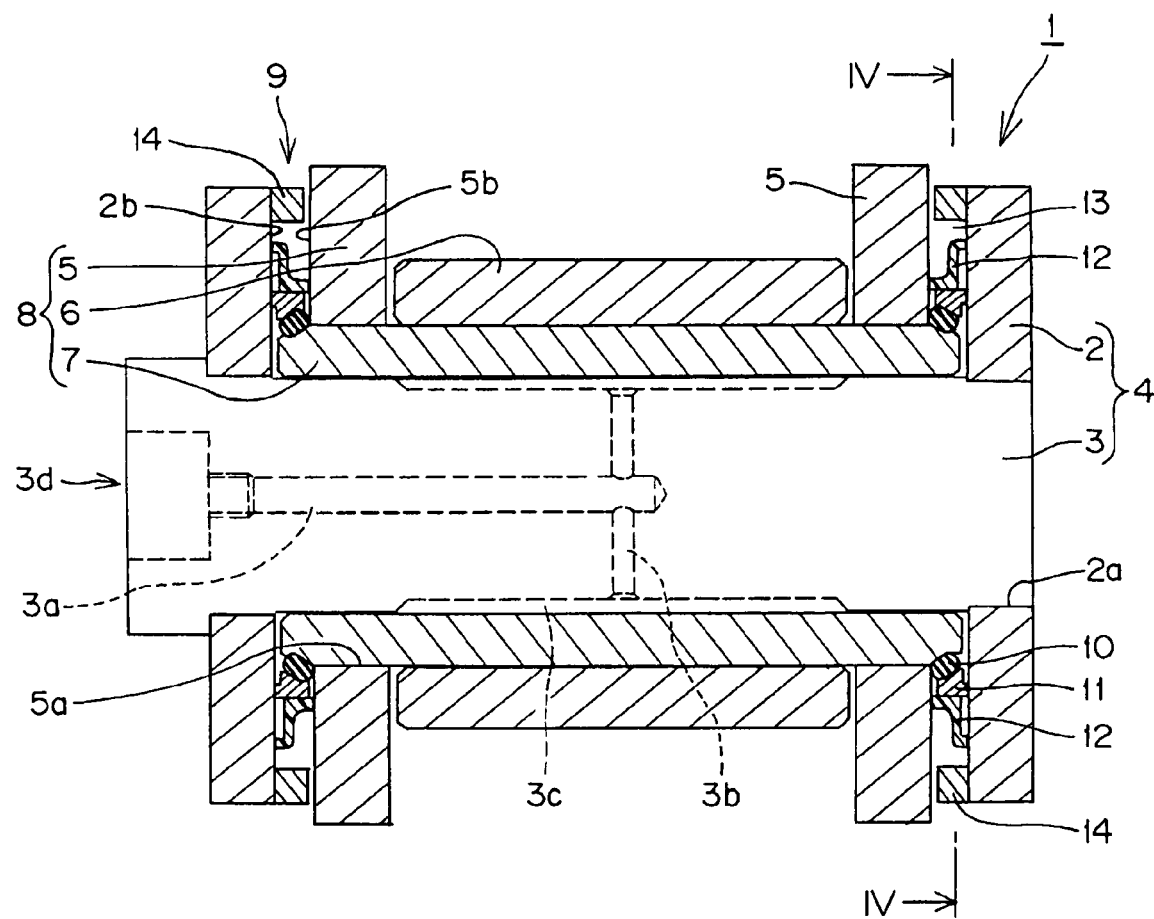
FIG. 2 is a cross-sectional view of the seal chain taken on a section plane perpendicular to the direction of travel of the chain.

As shown in FIG. 1, the chain comprises outer links 4 and inner links 8 in an alternating arrangement along the length of the chain. As shown in FIGS. 1 and 2 in an outer link 4 the ends of a pin 3 are fitted to, and secured in, pin holes 2a in outer link plates 2. A bushing 7 is similarly fitted to, and secured in bushing holes 5a in a pair of inner link plates 5. The ends of the bushing protrude beyond the outer faces of the inner link plates 5, and a roller is provided on the part of the bushing extending between the inner link plates. Each outer link plate has two pins, and each inner link plate has two bushings. The outer and inner links are articulably connected to one another in an alternating arrangement by virtue of the fact that one of the two pins of an outer link plate extends rotatably through a bushing in an inner link plate and the other pin of the same outer link plate extends rotatably through a bushing in another inner link plate.

As shown in FIG. 2, a seal mechanism 9 is disposed between the inner face 2b of an outer link plate 2 and the outer face 5b of an inner link plate 5.

The pin 3 includes internal oil passages 3a and 3b, and on its outer circumference, a concave groove 3c that communicates with the oil passage 3b. The passages and the groove are provided so that lubricant such as oil, grease or the like can be supplied to the gap between the outer circumferential surface of the pin 3 and the inner circumferential surface of the bushing 7 through an opening at one end of the pin 3, the opening being provided with a closure 3d. The oil passages, the groove and the opening in the end of the pin are optional, and can be omitted in some cases.

Figure 3:
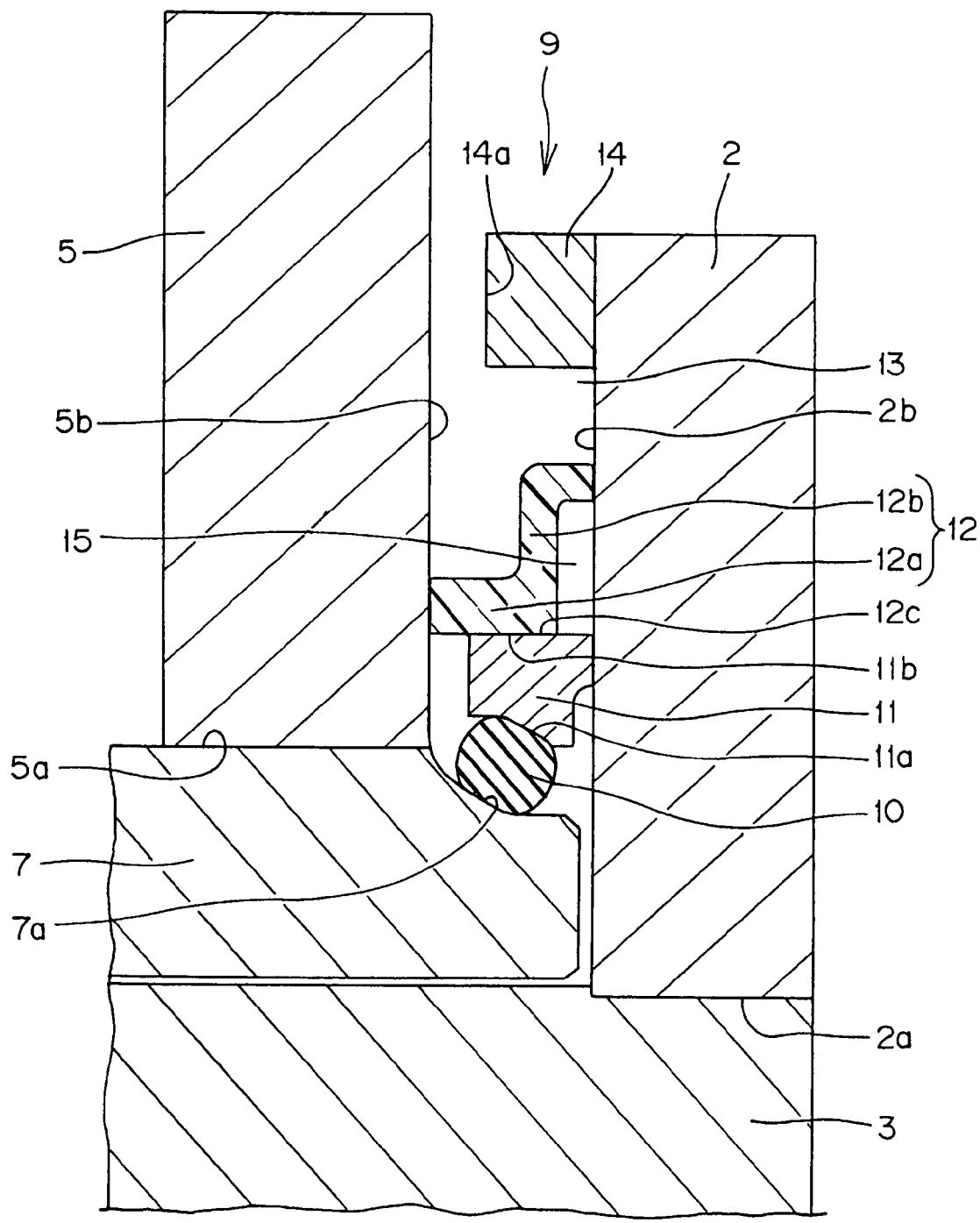
FIG. 3 is an enlarged sectional view showing the details of the seal.
Figure 4:
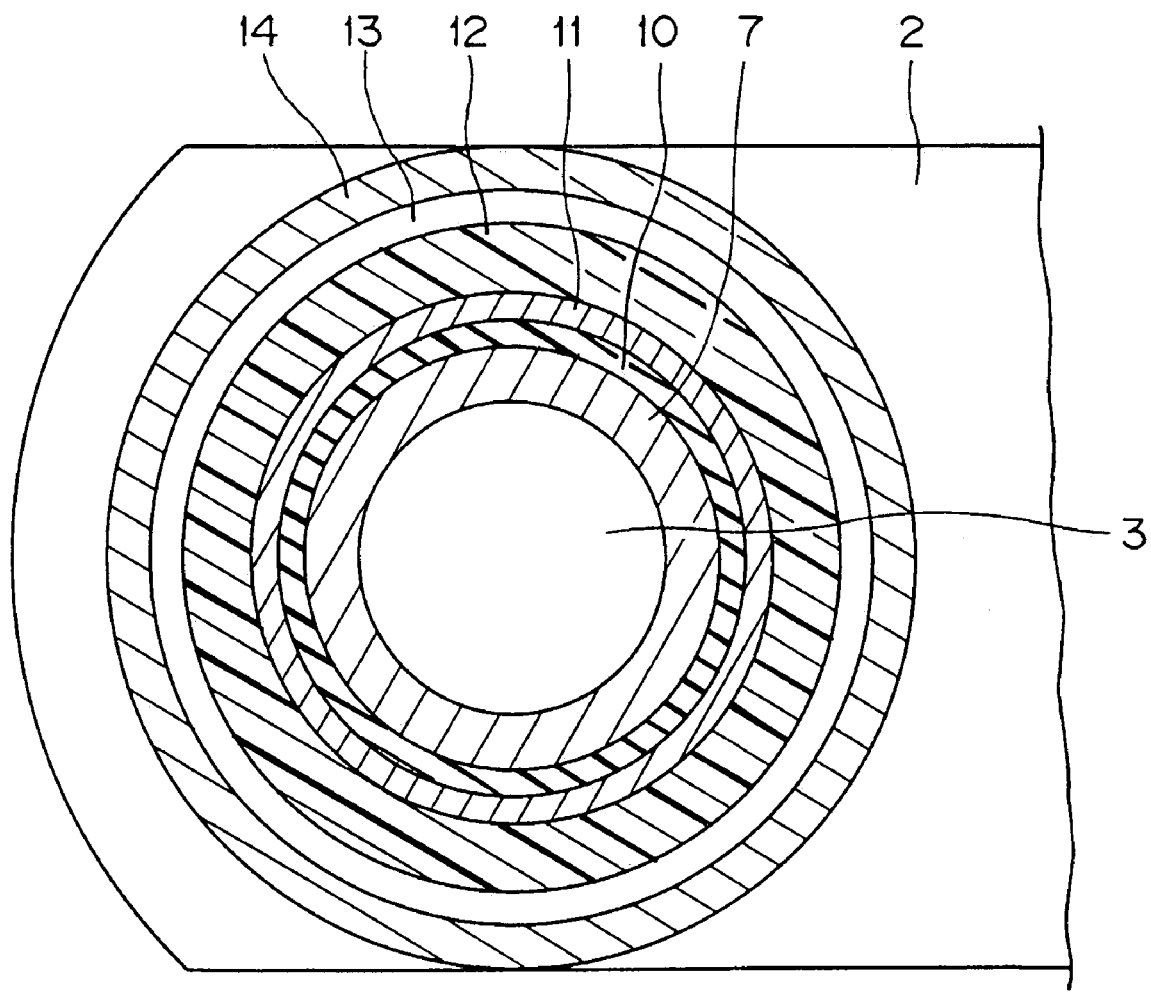
FIG. 4 is a cross-sectional view of a part of the chain taken on section plane IV-IV in FIG. 2.

As best seen in FIG. 3, the seal mechanism 9 comprises an elastic ring 10, which is coaxial with the pin 3, a seal ring 11 disposed outside the elastic ring 10, an annular resin seal 12 having a tongue, and a ring-shaped plate 14.

The elastic ring 10 is an O-ring composed of a synthetic resin or a synthetic rubber. Nitrile rubber or fluorine rubber are preferred as materials for the elastic ring 10 because of their good oil resistance, heat resistance and wear resistance. The seal ring 11, which is disposed outside the elastic ring 10 is preferably made of steel or stainless steel, and press-contacts the inner face 2b of the outer link plate 2.

The seal ring 11 has an inclined surface 11a formed on its inner circumferential surface. The elastic ring 10 is held between inclined surface 11a of the seal ring and an inclined surface 7a formed on the outer circumference of the end portion of the bushing 7 that protrudes outward beyond the outer face 5b of inner link plate 5.

An annular resin seal 12, having an annular base 12a and a tongue 12b that protrudes radially outward, is disposed outside the seal ring 11. The annular resin seal 12 is molded as a unit, preferably from MC nylon. The base 12a press-contacts the outer face 5b of the inner link plate 5. The inner circumferential surface 12c of the base 12a is in slidable contact with the outer circumferential surface 11b of the seal ring 11. The end of the tongue 12b remote from the base 12a is bent toward, and abuts, face 2b of the outer link plate 2.

The outermost part of the seal mechanism is a ring-shaped plate 14 spaced radially outward from the annular resin seal 12, and adhered to face 2b of the outer link plate 2 by welding. The ring-shaped plate is preferably made of steel or stainless steel.

A closed annular space 15 is defined by a part of the outer circumferential surface of the seal ring 11, a part of face 2b of the outer link plate, and the tongue of the annular resin seal 12. This annular space 15 forms a lubricant reservoir for oil that leaks past the sealing ring 11 and the elastic ring 10, extends the life of the seal, suppresses outward flow of lubricant, maintains lubrication between the seal ring 11 and the outer link plate 2, and maintains the lubricity of the seal chain 1 for a long period of time.

Since the seal mechanism 9 has a double seal structure composed of the elastic ring 10, the seal ring 11, and the annular resin seal 12, the seal chain according to the invention provides good seal performance and prevents the entry of foreign matter into the gap between the pin 3 and the bushing 7.

Furthermore, since the ring-shaped plate 14 suppresses the entry of foreign matter between opposed faces 2b and 5b of the outer and inner link plates, the endurance of the seal mechanism 9 is improved.

Figure 5A:
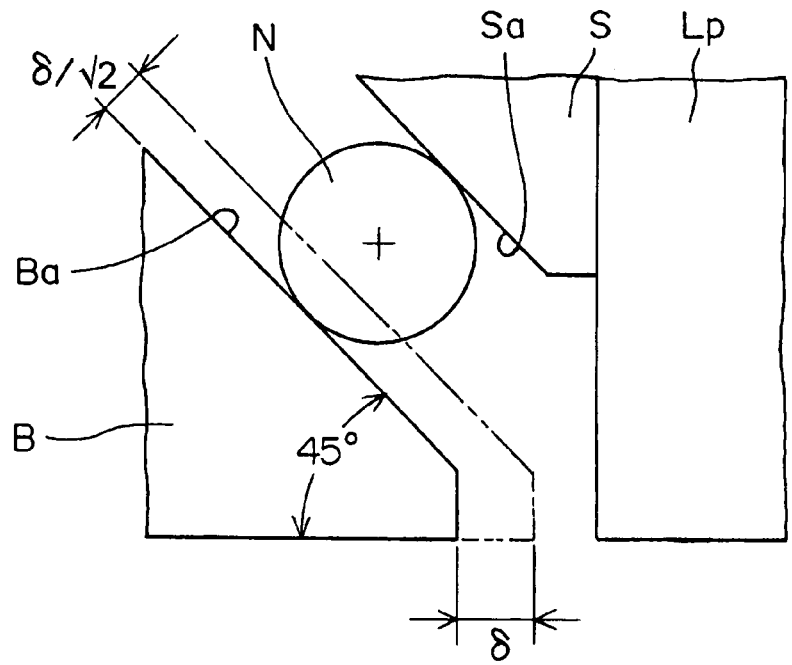
FIG. 5(A) is a schematic view explaining the operation of the seal according to the invention the invention.

Since the elastic ring 10 is held between inclined surface 7a on the outermost end of the bushing 7 and inclined surface 11a of the seal ring 11, the amount of deformation of the cross-section of the elastic ring 10 is less than the deformation of an elastic ring in a conventional seal chain. As a result, the endurance of the elastic ring 10 is improved. By way of illustration, FIG. 5A shows a ring N between inclined surface Ba on a bushing B and an inclined surfaces Sa of a seal ring S. These surfaces are both disposed at angles of 45° relative to the axial direction of the bushing. If the inner link plate moves toward the outer link plate Lp by an amount δ, the cross-section of the elastic ring N is deformed by an amount $\delta/\sqrt{2}$, that is, approximately 0.7δ. The ratio of the amount of deformation to the amount of movement of the plates toward each other is proportional to the sine of the angle measured between the inclined surfaces and the axial direction of the bushing. Preferably, the angle between the inclined surfaces and the bushing axis is 45° or less.

Figure 5B:
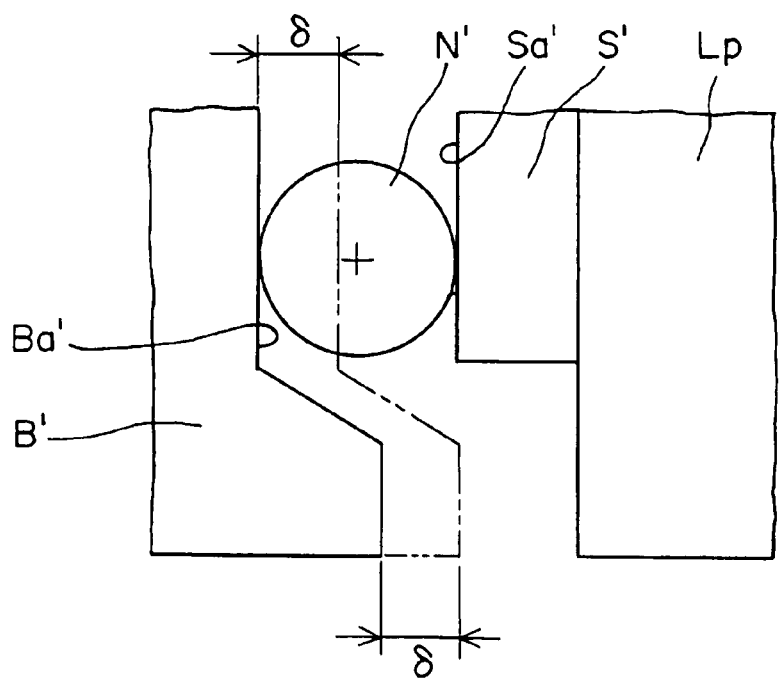
FIG. 5(B) is a schematic view explaining the operation of a conventional seal.

On the other hand, as shown in FIG. 5B, where an elastic ring N' is sandwiched between a vertical surface Ba' of a bushing B' and a vertical surface Sa' of a seal ring S', if the inner link plate approaches the outer link plate LP by an amount δ, the amount of deformation of the cross-section of the elastic ring N is also substantially equal to δ.

Figure 7:
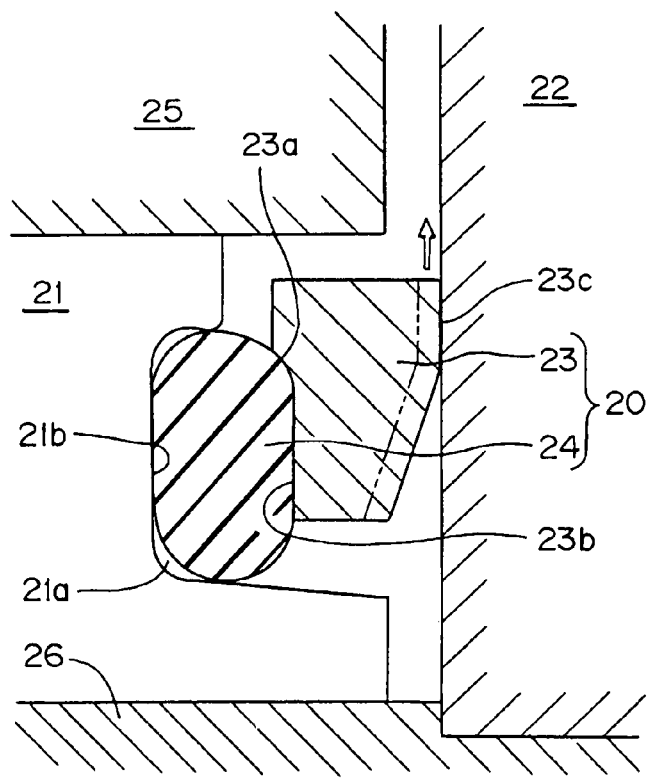
FIG. 7 is a schematic view showing the seal mechanism of a conventional seal chain.

By comparing FIG. 3 and FIG. 7, it can also be seen that, when the angle between the inclined surface on the end of the bushing is reduced, the wall thickness of the end of the bushing 7 can be increased, and the strength of the bushing can be maintained.

The inner circumferential surface 12c of the base 12a of the seal 12 is in sliding contact with the outer circumferential surface 11b of the seal ring 11. The base 12a press-contacts the outer face 5a of the inner link plate 5 and the end of the tongue abuts the inner face 2a of the outer link plate 2. When the inner link plate 5 shifts laterally so that it approaches or moves away from the outer link plate 2, the base of the annular resin seal 12 slides on outer circumferential surface 11b of the seal ring 11. Thus, the seal is always maintained, and the entry of foreign matter is prevented.

Figure 6:
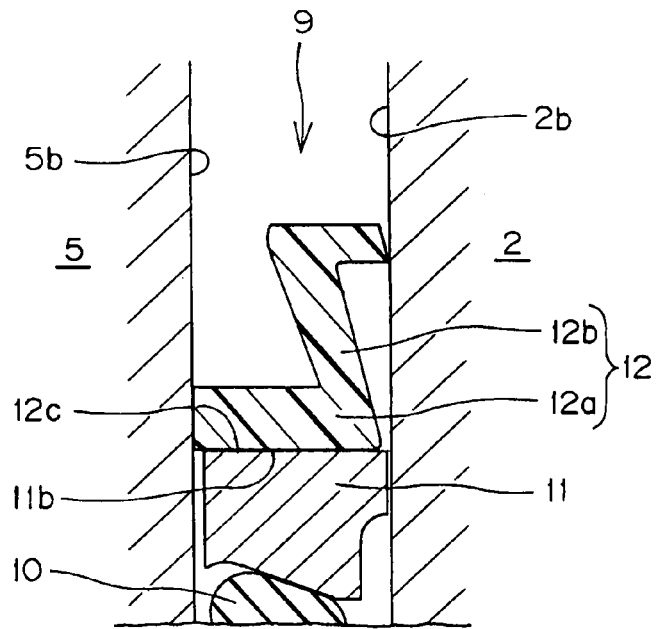
FIG. 6 is a schematic view showing an annular seal in its flexed condition.

When the outer link plate 2 and the inner link plate 5 approach each other, the annular resin seal 12 flexes as shown in FIG. 6. At the same time the end surface 14a of the ring-shaped plate 14 (FIG. 3) approaches or comes into sliding contact with the inner link plate 5. Thus, the plate 14 supplements the sealing effect of the annular resin seal 12. When the outer link plate 2 and the inner link plate 5 on one side approach to each other, the outer link plate 2 and the inner link plate 5 on the opposite side of the chain move away from each other. However, the annular resin seals on both sides maintain a seal on both sides as the links shift laterally relative to one another.

Even if the relative lateral movement of the links is sufficient to cause the end of a tongue 12b to separate from the inner face of the outer link plate 2, a labyrinth is formed by the space between the ring-shaped plate 14 and inner link plate 5 and the space between the tongue and the outer link plate. The labyrinth, together with the sliding contact between the base of the annular resin seal 12 and the outer circumferential surface 11b of the seal ring 11, ensure that outward flow of lubricant and entry of foreign matter can be prevented, and maintain good sealing performance.

Since the annular resin seal 12 is molded as a unit from MC nylon, the annular resin seal exhibits high endurance. The high endurance of the seal 12, and the lubricity between the seal 12 and an outer circumferential surface 11b of the seal ring 11 ensure good overall endurance of the seal mechanism 9.

We claim:

1. A seal chain comprising alternating outer and inner links, each outer link comprising a pair of spaced outer link plates having inner faces, and being connected by a pair of pins the ends of which are fitted to pin holes in the outer link plates, and each inner link comprising a pair of spaced inner link plates having outer faces and connected by a pair of bushings fitted into bushing holes in the inner link plates, the bushings having outer ends extending outward beyond the outer faces of said inner link plates, wherein each pin of an outer link extends rotatably though a bushing of an adjacent inner link, and seals for resisting the outward flow of lubricant from within the bushings and for resisting the entry of foreign matter into the bushings, each seal comprising:

an elastic ring coaxial with one of said pins, and in contact with an inclined outer circumferential surface formed on an outer end of one of said bushings;

a seal ring disposed in coaxial relationship with said elastic ring and having an inclined inner circumferential surface in contact with the elastic ring, whereby the elastic ring is held between the inclined outer circumferential surface of said one of said bushings and the inclined inner circumferential surface of the seal ring, the seal ring also having a surface press-contacting an inner face of an outer link plate and an outer circumferential surface;

an annular resin seal having an annular base in slidable contact with said outer circumferential surface, and a tongue extending radially outward from said annular base, the base of the annular resin seal press-contacting the outer face of an inner link plate, and said tongue abutting said inner face of an outer link plate; and a ring-shaped plate disposed radially outside the annular resin seal and adhering to said inner face of an outer link plate.

2. A seal chain according to claim 1, in which said annular resin seal is molded as a unit from a nylon resin.

3. A seal chain according to claim 1, having an enclosed annular space defined by the tongue of the annular resin seal, and portions of said inner face of an outer link plate and said outer circumferential surface of the seal ring.

4. A seal chain according to claim 3, in which said annular resin seal is molded as a unit from a nylon resin.

* * * * *